Nov. 13, 1945. J. H. COTTON 2,388,830
MICRO WAVE CONTROL APPARATUS
Filed May 29, 1941
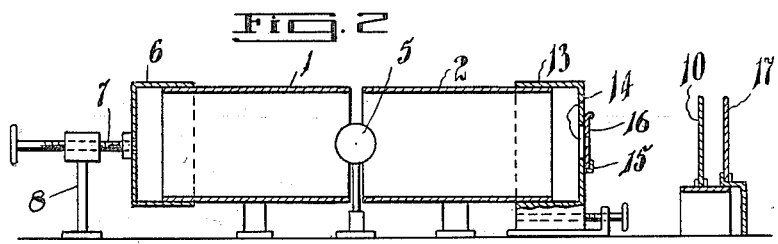
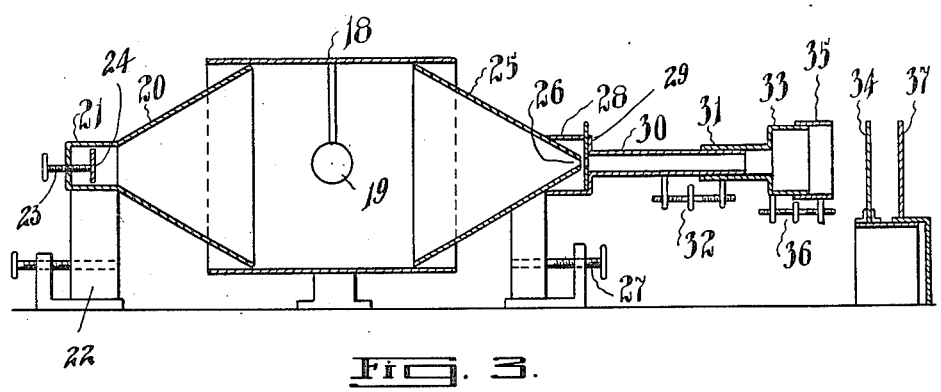
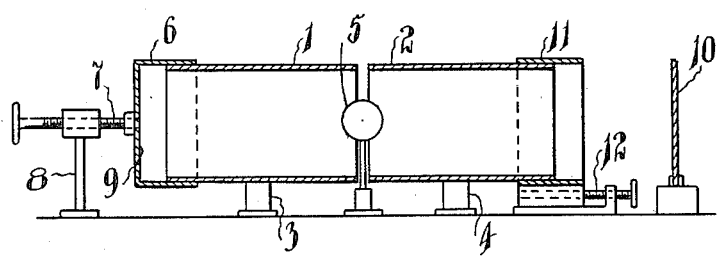
Inventor
J. H. Cotton
ATTY pattern# UNITED STATES PATENT OFFICE 2,388,830

MICRO WAVE CONTROL APPARATUS

James Henry Cotton, Toronto, Ontario, Canada

Application May 29, 1941, Serial No. 395,830
In Canada August 19, 1939

5 Claims. (Cl. 250—11)

This invention relates to improvements in apparatus for directing and controlling waves emanating from a micro wave source in a concentrated clearly defined directional beam for the treatment of organic substances to create a state of analgesia or anaesthesia in localized areas or to render innocuous or kill bacteria.

A further object of this invention is to provide an apparatus which will enable the polarization of the beam wave.

The principal features of the invention consist in enclosing the wave source intermediate of the length of a tube provided with a surface adjustably arranged at one end and adapted for reflecting micro waves and having means at the opposite end of said tube for adjusting the length and other dimensions of the tube to control the final discharge of the wave beam in relation to the object to be treated.

In the accompanying drawing

Figure 1 is a sectional diagrammatic view of a simple form of my invention illustrating the principle involved in the control of the micro wave.

Figure 2 is a diagrammatic longitudinal vertical mid-sectional view illustrating a further means of control of the micro wave.

Figure 3 is a diagrammatic longitudinal vertical mid-sectional view of a still further modification of the apparatus.

It has been ascertained in the practical application of therapeutics that certain electrically energized waves have distinct reaction upon organic matter, the X-ray and Hertzian waves being extremely well known examples.

It is also known that waves of varying lengths and physical properties may emanate from a single source.

One of the greatest problems in the practical application of therapeutics with wave impulses has been the difficulty of segregating the innumerable wave lengths so that certain clearly defined wave length limitations can be utilized definitely in relation to certain defined physical conditions.

It is known that certain forms of electrodes produce certain types or lengths of waves and this invention has been devised principally to control the extremely short or micro waves and concentrate them in a beam which may be directed at the surface to be treated so that only the area coincident with that beam will be affected thereby.

It is also known to those conversant with the characteristics of wave-producing electrodes that in addition to the fundamental wave lengths produced there are also numerous harmonics and for certain results it may be found desirable to select a certain type of wave source and to concentrate and project the fundamental waves along with the harmonics.

A simple type of apparatus for producing such a result is shown in Figure 1. In the structure shown in Figure 1 a pair of tubes 1 and 2, which are open at both ends, are rigidly mounted in axial alignment on suitable supports 3 and 4 respectively. The inward adjacent ends of these tubes are preferably slightly spaced apart and supported axially within these tubes at the juncture point is a source of electrical wave energy 5. This source may be varied and may be chosen to produce a desired fundamental wave length.

Arranged at the outer end of the tube I is a sleeve 6 which is slidable in relation to the tube 1 and is supported for longitudinal adjustment upon a suitable threaded rod 7 threaded in a support 8 which thus provides micrometer adjustment for the sleeve. The outer end of the sleeve is closed and presents a reflecting surface 9 to reflect waves striking thereupon. The adjustable sleeve with its reflector may be adjusted to tune to reflect desirable wave length emanating from the source 5.

It will be understood of course that if one wave length only is desired the arrangement of the reflecting surface may be calibrated an exact distance from the source.

Waves emanating from the source strike the inner walls of the tubes 1 and 2 and those within the tube 1 are ultimately reflected back to pass through the tube 2 and they mingle with the waves flowing through the tube 2, with the ultimate result that a beam of waves is produced which is projected from the open end of the tube 2 to strike upon a restricted area of the subject 10 to be treated.

The tuning of the tube 2 may also be required in regard to the wave length being selected being most effectively directed toward the subject 10 and in order to accomplish this a sleeve 11 is telescopically mounted on the sleeve 2 and provided with a suitable micrometer means of adjustment 12.

For the isolation of harmonics from fundamental waves for a particular treatment of certain substances the apparatus may be modified as illustrated in Figure 2 by providing a sleeve 13 adjustably mounted on the discharge end of the tube 2 which is closed at the outer end and has a central opening 14 and a suitable guide 15 on the outer side into which a slide 16 is inserted, this slide having an orifice of a selected size adapted to permit the passage of waves of a certain length therethrough but to form a barrier for waves of larger length. The selection of such an orifice slide may be utilized definitely in polarizing the waves passing therethrough. That is to say, by choosing an orifice of slightly greater dimensions than the length of waves which it is desired to use, the waves in passing through such orifice become polarized uniformly in the same direction.

It has been found by careful experiment with the apparatus disclosed herein that waves emitted at the source 19 are polarized in a horizontal or vertical direction. This polarization may be determined by placing a grid having upright bars in the path of the waves and if the waves are reflected as from a plain metal plate but will pass through a similar grid with bars horizontal such waves are considered to be polarized horizontally. Experiment shows that, in controlling ultra micro waves such as this invention contemplates, if waves are absorbed inside the orifice 26 by an upright grid but if permitted to pass through said orifice they were absorbed by a horizontal grid the passage through the orifice polarized such waves and the maximum physiological effect of such waves was produced. The size of the orifice must be regulated to prevent waves of greater length than required from passing through.

In the application of the beam of micro waves to the treatment of the subject 10 it may be found that some of the waves pass through and beyond the subject and in order to achieve the maximum efficiency of the wave effect upon the subject it may be found desirable to place a reflector element 17 beyond the subject so that penetrating waves may be reflected back.

In the form of the device illustrated in Figure 3 where it may be found desirable to use a wave source emitting waves of greater length than those used in the more simple form of the device shown in Figures 1 and 2, a tube 18 of larger dimensions than the tube 2 has arranged centrally of the length thereof a wave source 19 and arranged in one of the open ends of this tube is a tubular frustro-conical member 20 which is provided at its smaller end with a reduced size tube 21. This member 20—21 is preferably mounted for longitudinal adjustment in relation to the tube 18 and has a micrometer adjustment 22 of suitable form. Mounted within the outer closed end of the tube 21 is a micrometer adjusting member 23 which carries a reflector member 24 which reflects axially the micro waves which are not stopped or deflected by the converging walls of the member 20.

Arranged within the end of the tube 18 opposite to that containing the member 20 is a similar tubular conical member 25 which has a small orifice 26 at the apex. This cone member is supported for axial adjustment by a micrometer adjusting member 27.

A tubular extension 28 is mounted on the cone member 25 adjacent to the apex thereof and at the outer end of the tube 28 is mounted a slide holder 29 into which slides having regulated orifices therein are inserted.

Attached to the slide holder and extending axially in relation to the tube 18 is a small tube 30 which conducts the beam of waves projected through the orifice in the slide and maintains such waves in a small concentrated beam. This tube has telescopically arranged upon its outer end a tube extension 31, which is adjusted by means of a micrometer adjustment 32 mounted between the two portions of the tube, and at the outer end of the extension 31 is mounted an enlarged tubular member 33 which permits expansion of the wave beam so that it may have a desired area of application to the subject 34.

Mounted upon the tube 33 is an extension tube 35 which may be adjusted by the micrometer adjustment device 36 in order to tune the length of the direction tube 33 to the waves that are being projected. A reflector member 37 may be arranged beyond the subject to reflect back waves that may pass through the subject.

It will be understood that many variations in the structure of the device such as herein described may be made for the more accurate tuning of the wave-controlling apparatus at various points without departing from the essential feature of this invention which is to control by reflection in various ways the micro waves which it is desired to use for certain definite predetermined purposes. These will vary in accordance with the subject and the conditions in the subject which it is desired to affect, either to produce analgesia or anaesthesia or actual decimating effects upon bacteria or cell life.

In the practical application of this invention it is found that, by lengthening or shortening various parts of the apparatus by means of sleeves, movable reflectors or other means, various wave lengths or harmonics may be abstracted from the fundamental waves and directed to the subject requiring treatment and human, animal, plant or bacterial matter may be effectively treated for selected results by the effective isolation of harmonics from fundamentals for such treatment and even harmonics may be isolated from other harmonics for the same purpose.

Further, it will be understood that after the desired wave length has been segregated the beam emitted through the final selection aperture may be conducted by means of a tube, which may be flexible or rigid, to the locality where the application is to be made.

It will also be understood that the use of converging surfaces within the tube enclosing the wave source is an important feature of the invention in effecting the concentration of the waves desired toward the diaphragm or emission orifice so that a greater output of the selected waves through the orifice may be maintained, thus making more of the desired impulse available for treatment purposes.

It will also be understood that while I have shown diagrammatically certain reflectors these may be formed to present flat, parabolic or other surfaces, which will be best designed for concentration of the waves and the tuning of the distances required for proper and effective wave concentration.

What I claim as my invention:

1. An apparatus for controlling and directing micro waves for physiological treatment comprising a tube, a micro wave source arranged axially of and intermediate of the length of said tube, a tubular conical member arranged in each end of said tube for deflecting and separating the longer wave lengths from the required micro waves and each having an orifice in its apex, a micro wave reflector adjustably mounted axially of the apex orifice in one of said conical members, and longitudinally adjustable tubular members arranged beyond the orifice in the apex of the other conical member and adapted to tune and direct in a beam the micro waves selectively passing through the cone orifice leading thereto.

2. An apparatus as claimed in claim 1 in which the conical tubular members are adjustable longitudinally of said tube.

3. An apparatus as claimed in claim 1 in which the micro wave reflector is adjustable axially.

4. An apparatus as claimed in claim 1 in which a conductor tube extends from the conical wave emitting tubular member and the adjustable tubular wave tuning means comprises a pair of tubular members of greater diameter than the conductor tube and lesser diameter than the main wave source enclosing tube and telescopically adjustable.

5. An apparatus as claimed in claim 1 in which a wave reflector medium is placed in the line of direction of the wave beam emitted from the telescopically adjustable tuning means to reflect the waves back through an object placed therebetween.

JAMES HENRY COTTON.